(12) United States Patent
Collis

(10) Patent No.: US 10,427,238 B2
(45) Date of Patent: Oct. 1, 2019

(54) AUTOMATED WELDING APPARATUS AND COMPUTER-IMPLEMENTED METHOD FOR FILING A VOLUME

(71) Applicant: ROLLS-ROYCE PLC, London (GB)

(72) Inventor: Andrew R. Collis, Ryde (GB)

(73) Assignee: ROLLS-ROYCE PLC, London (GB)

( * ) Notice: Subject to any disclaimer, the term of this patent is extended or adjusted under 35 U.S.C. 154(b) by 674 days.

(21) Appl. No.: 15/158,329

(22) Filed: May 18, 2016

(65) Prior Publication Data

US 2016/0361775 A1 Dec. 15, 2016

(30) Foreign Application Priority Data

Jun. 9, 2015 (GB) .................................. 1509964.1

(51) Int. Cl.
*B23K 26/34* (2014.01)
*B23K 9/095* (2006.01)
(Continued)

(52) U.S. Cl.
CPC .......... *B23K 9/0953* (2013.01); *B23K 9/0026* (2013.01); *B23K 9/032* (2013.01); *B23K 9/044* (2013.01); *B23K 9/0956* (2013.01); *B23K 9/167* (2013.01); *B23K 9/173* (2013.01); *B23K 9/23* (2013.01); *B23K 15/0006* (2013.01); *B23K 15/0013* (2013.01); *B23K 15/0026* (2013.01); *B23K 15/0073* (2013.01); *B23K 15/02* (2013.01); *B23K 26/032* (2013.01);
(Continued)

(58) Field of Classification Search
CPC ............. B23K 26/0012; B23K 26/345; B23K 26/032; B23K 26/0626; B23K 26/082; B23K 26/0807; B23K 26/32; B23K 36/34; B23K 26/342; B23K 31/125; B23K 2203/08; B23K 9/0953; B23K 9/0026; B23K 9/032; B23K 9/167; B23K 9/173; B23K 15/0006; B23K 15/0013; B23K 15/0026

See application file for complete search history.

(56) References Cited

U.S. PATENT DOCUMENTS

| 5,227,609 A * | 7/1993 | Simon | B23K 9/02 219/137 R |
| 2013/0048619 A1* | 2/2013 | Doyle | B23K 9/0956 219/122 |
| 2015/0048058 A1* | 2/2015 | Bruck | B23K 26/34 219/76.14 |

FOREIGN PATENT DOCUMENTS

CN 203437814 U 2/2014
EP 0423088 A1 4/1991
(Continued)

OTHER PUBLICATIONS

Mar. 14, 2016 Search Report issued in Great Britain Patent Application No. 1509964.1.

*Primary Examiner* — Brian W Jennison
(74) *Attorney, Agent, or Firm* — Oliff PLC

(57) ABSTRACT

An automated welding apparatus and computer-implemented method are described which generally perform the steps of: scanning a joint interface of a workpiece using a three-dimensional scanner (S4); determining a volume to be filled by a welding process (S6); determining a specification for the welding process based on the volume to be filled using an algorithm (S8, S10); and controlling a welding device so as to execute the specification by moving the welding device relative to the workpiece (S12).

14 Claims, 6 Drawing Sheets

(51) Int. Cl.
*B23K 26/082* (2014.01)
*B23K 26/342* (2014.01)
*B23K 9/04* (2006.01)
*B23K 9/00* (2006.01)
*B23K 9/032* (2006.01)
*B23K 9/167* (2006.01)
*B23K 9/173* (2006.01)
*B23K 9/23* (2006.01)
*B23K 15/00* (2006.01)
*B23K 15/02* (2006.01)
*B23K 26/03* (2006.01)
*B23K 26/08* (2014.01)
*B23K 26/30* (2014.01)
*B23K 26/32* (2014.01)
*B23K 101/00* (2006.01)
*B23K 103/18* (2006.01)

(52) U.S. Cl.
CPC ............ *B23K 26/08* (2013.01); *B23K 26/082* (2015.10); *B23K 26/30* (2013.01); *B23K 26/32* (2013.01); *B23K 26/342* (2015.10); B23K 2101/001 (2018.08); B23K 2103/26 (2018.08)

(56) References Cited

FOREIGN PATENT DOCUMENTS

| | | | |
|---|---|---|---|
| EP | 2724808 | A1 | 4/2014 |
| WO | 2009/126023 | A1 | 10/2009 |
| WO | 2014/042970 | A1 | 3/2014 |

* cited by examiner

AUTOMATED WELDING APPARATUS AND COMPUTER-IMPLEMENTED METHOD FOR FILING A VOLUME

The invention relates to an automated welding apparatus and a computer-implemented method for filling a volume with a weld and particularly, but not exclusively, to such an automated welding apparatus and method which uses a Tungsten Inert Gas (TIG) welding process to join outlet guide vanes to an inner ring.

FIG. 1 shows an inner ring 1 of a conventional outlet guide vane assembly. The inner ring 1 is provided with a plurality of stubs 3 which are spaced circumferentially around the outer surface of the inner ring 1. As shown in FIG. 2, an outlet guide vane 5 is joined to each of the stubs 3 using a welding process, such as Tungsten Inert Gas (TIG) welding.

Conventionally, the joining of the outlet guide vanes 5 to the inner ring 1 has been a manual process requiring significant skill and experience. In particular, the operator must control the welding parameters so as to "fill" the mating surfaces with the required volume of weld. This is made particularly difficult since, owing to manufacturing tolerances (particularly of the outlet guide vanes 5), the geometry of each joint varies, even within a single assembly. Each welding operation is therefore unique. Consequently, the joining of the outlet guide vanes 5 to the inner ring is time consuming and requires a highly skilled operator.

The invention seeks to overcome the issues associated with the prior art by providing a welding method and apparatus which is more automated and thus less reliant on the skill of the operator.

In accordance with an aspect of the invention there is provided an automated welding apparatus comprising: a welding device configured to move relative to a workpiece in order to perform a welding process; a three-dimensional scanner configured to scan a joint interface of the workpiece and to determine a volume to be filled by the welding process; and a controller connected to the three-dimensional scanner and the welding device, the controller having an algorithm configured to determine a specification for the welding process based on the volume determined by the three-dimensional scanner and being configured to control the welding device so as to execute the specification by moving the welding device relative to the workpiece.

The algorithm may determine the number of weld passes required to fill the volume.

The algorithm may determine the position and order of the weld passes.

The position and order of the weld passes may be optimised based on a defined characteristic.

The three-dimensional scanner may be configured to rescan the joint interface of the workpiece following the or each weld pass and to determine a remaining volume to be filled by the welding process. Alternatively, for expediency, only the last layer may be actively scanned and filled.

The controller may be configured to adjust the specification for the welding process based on the remaining volume to be filled by the welding process. In other words, the controller compares the actual weld bead against a predicted weld bead and makes adjustments where the actual weld bead differs from that predicted.

The controller may be configured to determine that the welding process is complete once the three-dimensional scanner determines that the volume has been fully filled.

The controller may be configured to apply a cosmetic weld once the three-dimensional scanner determines that the volume has been fully filled.

The algorithm may determine welding parameters for a weld pass of the welding process.

The three-dimensional scanner may be a non-contact scanner. This may allow the geometry of the workpiece to be quickly measured, particularly when it is still hot following a weld pass.

The welding device may be an arc (for example, TIG), laser or electron beam welding device.

In accordance with another aspect of the invention there is provided a computer-implemented automated welding method comprising: scanning a joint interface of a workpiece using a three-dimensional scanner; determining a volume to be filled by a welding process; determining a specification for the welding process based on the volume to be filled using an algorithm; and controlling a welding device so as to execute the specification by moving the welding device relative to the workpiece.

The algorithm may determine the number of weld passes required to fill the volume.

The algorithm may determine the position and order of the weld passes.

The position and order of the weld passes may be optimised based on a defined characteristic.

The method may further comprise rescanning the joint interface of the workpiece following the or each weld pass so as to determine a remaining volume to be filled by the welding process.

The method may further comprise adjusting the specification for the welding process based on the remaining volume to be filled by the welding process. In other words, the controller compares the actual weld bead against a predicted weld bead and makes adjustments where the actual weld bead differs from that predicted.

The method may further comprise determining that the welding process is complete when the volume has been fully filled.

The method may further comprise applying a cosmetic weld once the volume has been fully filled.

The algorithm may determine welding parameters (i.e. torch angle/distance, amperage, voltage, filler metal feed, weld head speed etc.) for a weld pass of the welding process.

The three-dimensional scanner may be a non-contact scanner. This may allow the geometry of the workpiece to be quickly measured, particularly when it is still hot following a weld pass.

The welding device may be an arc (for example, TIG), laser or electron beam welding device.

For a better understanding of the invention, and to show more clearly how it may be carried into effect, reference will now be made, by way of example, to the accompanying drawings, in which:—

FIG. 3 shows an embodiment of a welding apparatus 2 according to an aspect of the invention.

The welding apparatus 2 comprises a three-dimensional (3D) scanner 4, such as a non-contact white or blue light, laser, X-ray or ultrasound scanner. The 3D scanner 4 is connected to a controller 6 which is in turn connected to a welding device 8, such as a TIG welding device or other arc welding device.

Figure 4:
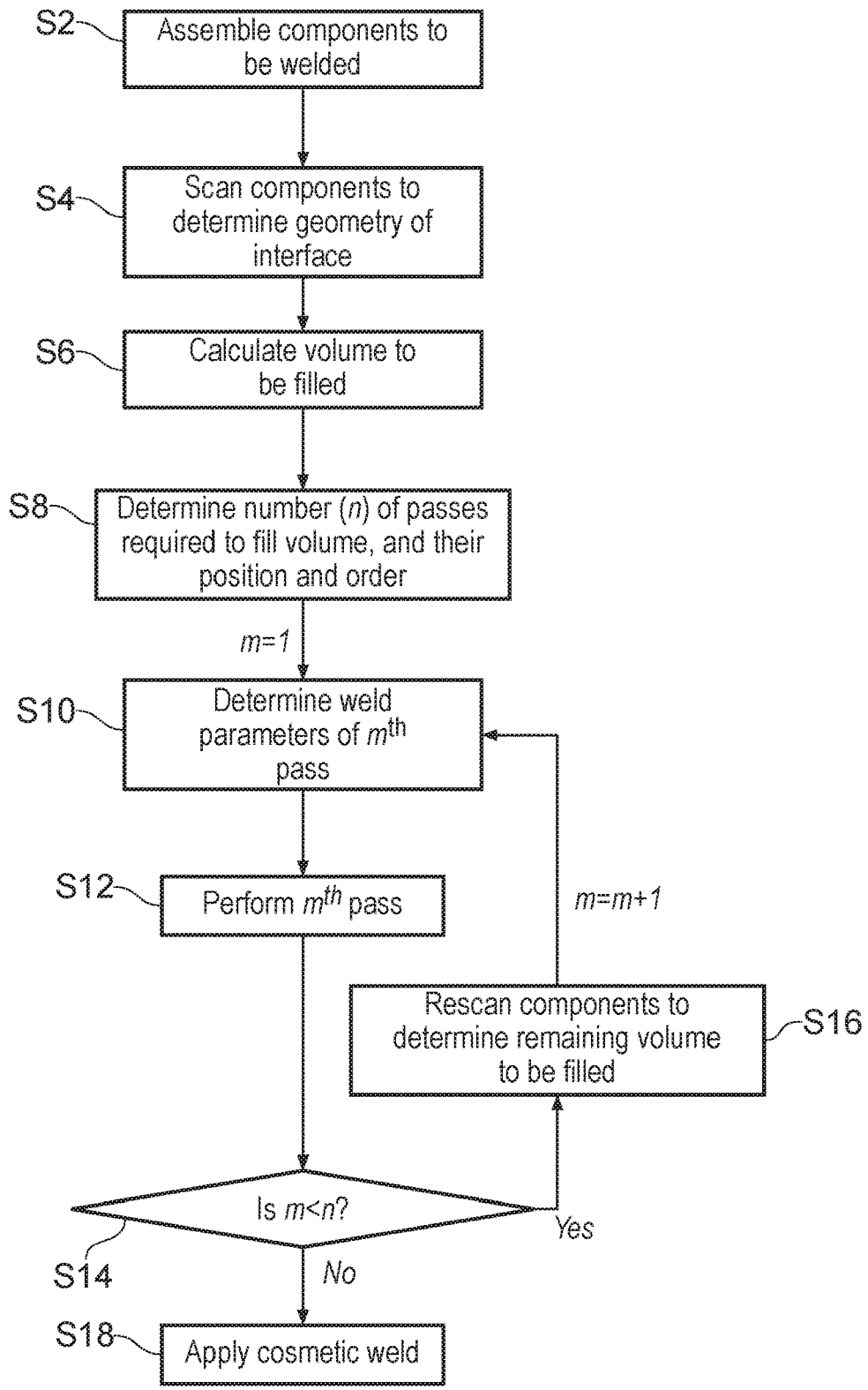
FIG. 4 is a flowchart of an embodiment of a welding method according to another aspect of the invention.
Figure 5:
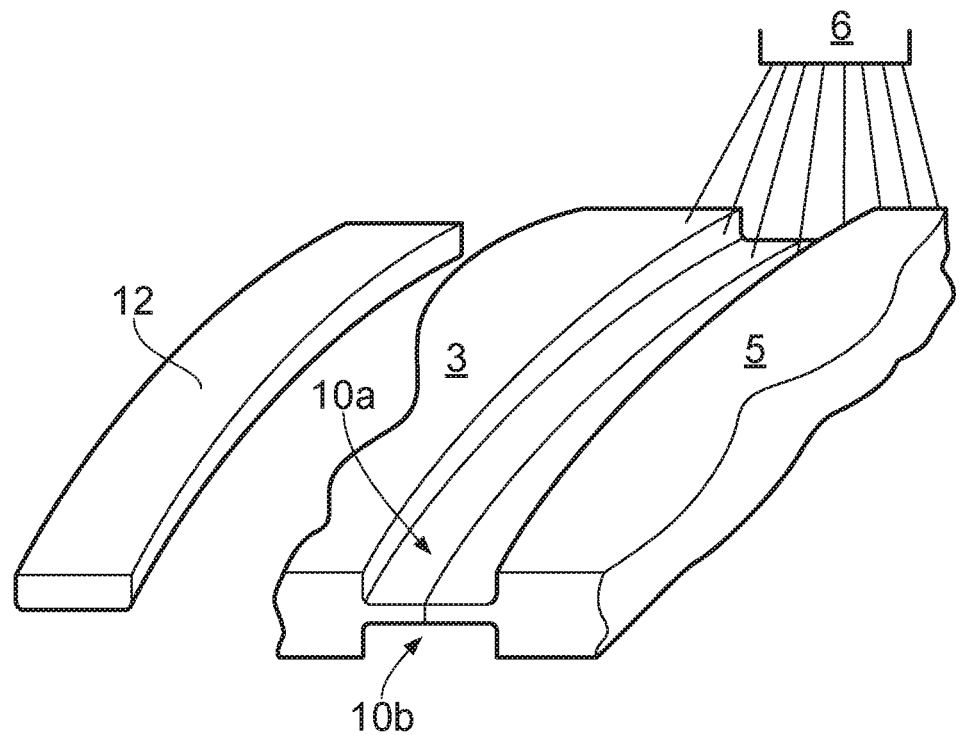
FIG. 5 is a perspective view of two components assembled for welding showing a measurement stage of the method.

FIG. 4 shows a flowchart of an embodiment of a welding method according to another aspect of the invention. The steps of the welding method of FIG. 4 may be performed by the welding apparatus 2. Specifically, the welding method may be implemented in software which is executed by a processor of the controller 6 in conjunction with the 3D scanner 4 and the welding device 8. The controller 6 may thus be embodied as a standard computer configured by software to perform the necessary functions or as a purpose-built device.

Figure 1:
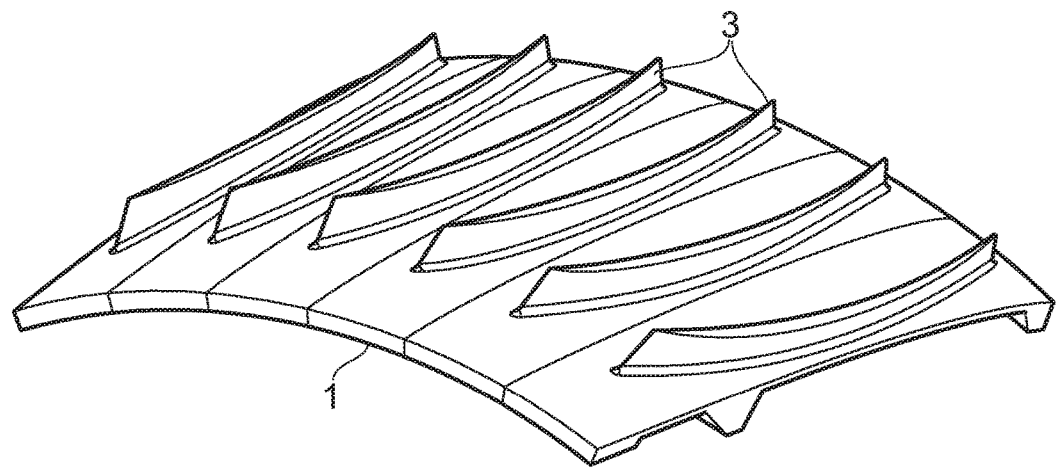
FIG. 1 is perspective view of part of an inner ring of a conventional outlet guide vane assembly.
Figure 2:
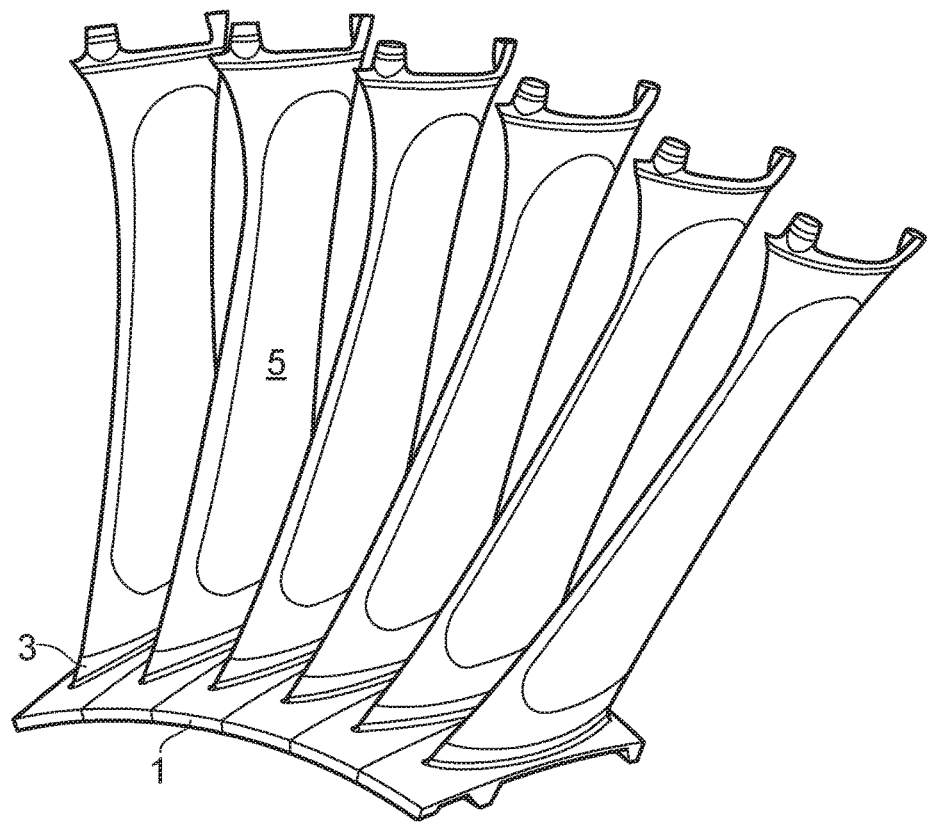
FIG. 2 is a perspective view of part of the outlet guide vane assembly with outlet guide vanes joined to the inner ring of FIG. 1.
Figure 3:
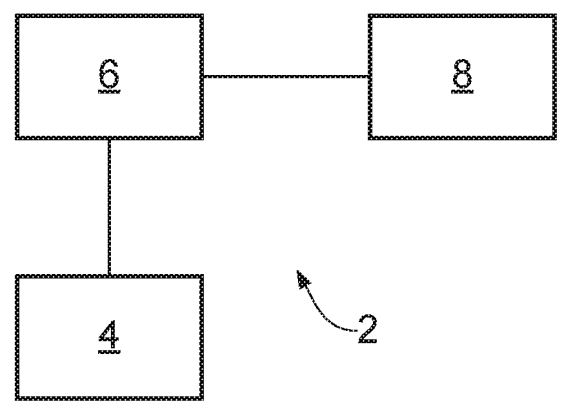
FIG. 3 is a schematic view of an embodiment of a welding apparatus according to an aspect of the invention.

In a first step (S2) of the welding method the components to be welded are assembled to define the joint geometry. This may include preparation of the joint surfaces, such as degreasing using a suitable solvent. For example, FIG. 3 shows an outlet guide vane 5 abutted against a stub 3 of the inner ring 1 described previously.

Owing to the thickness of the stub 3 and outlet guide vane 5, the assembly must be butt welded from both sides. As shown, a J-groove is formed in both the upper and lower surfaces of the stub 3 and the outlet guide vane 5 at their distal ends. Accordingly, when abutted against one another, the stub 3 and outlet guide vane 5 form a double-U joint having a pair of U-shaped channels 10a, 10b. Each U-shaped channel 10a, 10b provides access to the root of the weld to allow filler material to be added. However, following the welding process, the U-shaped channel 10a, 10b must be filled by the weld metal to form a bead which sits flush or just proud of the surface and requires little or no post-weld finishing.

The geometry of the joint interface is measured (S4) using the 3D scanner 4 and converted into a parameterised solid model which can be used for computer-aided manufacturing. From the geometry of the joint interface, at step S6, a volume 12 of the U-shaped channel 10a, 10b to be filled is calculated (including its shape and position). An algorithm is then used to determine the number (n) of weld passes required to fill the measured volume 12, the position of the passes within the channel 10a, 10b and the order of the passes (S8). The algorithm determines the optimum way in which to fill the volume 12. The algorithm may be configured to optimise the welding process based on maximising speed, minimising filler metal, achieving a prescribed quality level (i.e. minimising defects) or any other desired characteristic.

In the example described below, the algorithm determines that four weld passes are required to adequately fill the measured volume 12. The first weld pass is a root pass and the subsequent weld passes form filler passes. Each pass may have the same or different bead types. For example, the first root pass may use a stringer bead, whereas the subsequent filler passes may use a weave bead.

At step S10, the algorithm determines the weld parameters for the first weld pass which are used to control the welding device 8.

Figure 6:
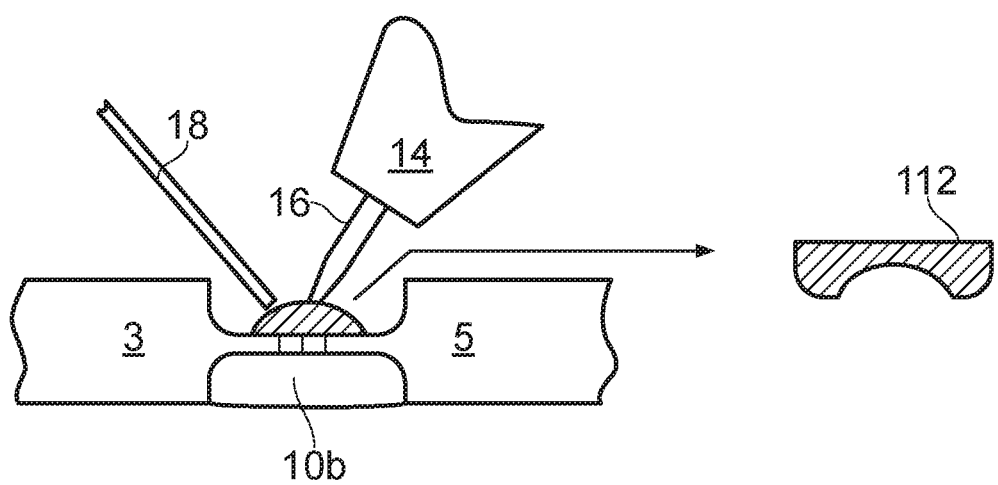
FIG. 6 is a cross-sectional view of a first welding stage of the method.

As shown in FIG. 6, the welding device 8 comprises a welding torch 14 having an electrode 16, such as a tungsten electrode. The welding device 8 further comprises a filler feed which supplies a filler metal 18 in the form of a wire or rod to the weld pool. The welding device 8 may comprise a robotic arm or the like which guides the welding using a NC torch 14 and the filler metal 18 across the joint interface. The outlet guide vane assembly may be held on a rotary table which rotates the assembly so as to present the next joint interface to be welded.

The weld parameters may include the angle of the torch 14 to the surface (both work and travel angle), the distance between the electrode 16 and the surface, amperage, voltage, shielding gas flow rate, filler feed rate and the movement of the torch 14 relative to the assembly (determining bead type).

The controller 6 then instructs the welding device 8 to perform the first weld pass at step S12. As shown in FIG. 6, in this instance, the first weld pass is located along the centre of the U-shaped channel 10a, where the outlet guide vane 5 abuts against the stub 3.

At S14, the controller 6 determines whether the number of passes completed m is less than the number of passes required n. In this example, the number of passes completed m (one) is less than the number of passes required n (four) and so the method proceeds to step S16 where the controller 6 instructs the 3D scanner 4 to rescan the joint interface to determine the volume actually filled by the first weld pass and a remaining volume 112 to be filed. The method then returns to step S10 to determine the weld parameters for the second weld pass.

Although some of the weld parameters for the second pass are known from S8, S10 determines any undefined parameters. The controller 6 may also verify any previously defined parameters and make adjustments based on the remaining volume 112 to be filled. Accordingly, if the first weld pass provides a different geometry to that predicted, then this can be corrected in subsequent weld passes.

Figure 7:
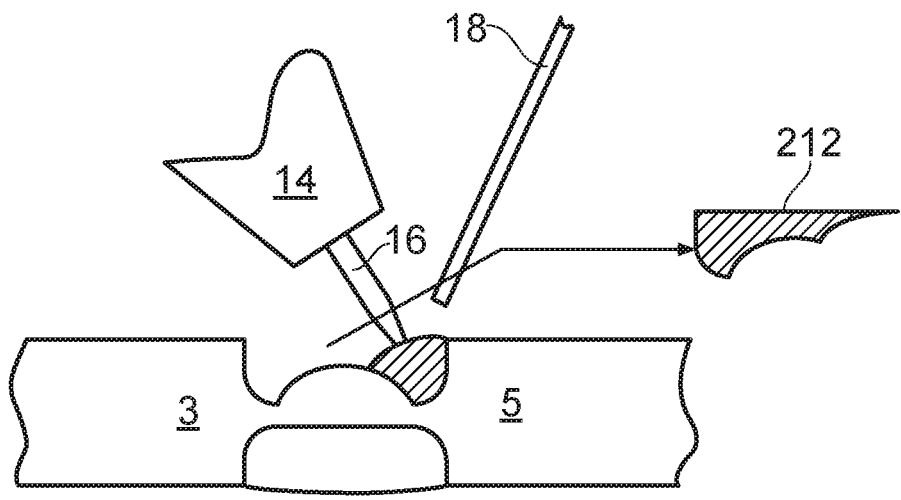
FIG. 7 is a cross-sectional view of a second welding stage of the method.

The controller 6 then instructs the welding device 8 to perform the second weld pass at step S12. As shown in FIG. 7, in this instance, the second weld pass is located toward the OGV-side of the U-shaped channel 10a.

The controller 6 again determines whether the number of passes completed m is less than the number of passes required n. In this example, the number of passes completed m (two) is less than the number of passes required n (four) and so the controller 6 again instructs the 3D scanner 4 to rescan the joint interface to determine the volume actually filled by the second weld pass and a remaining volume 212 to be filed (S16). The method then returns to step S10 to determine the weld parameters for the third weld pass.

Figure 8:
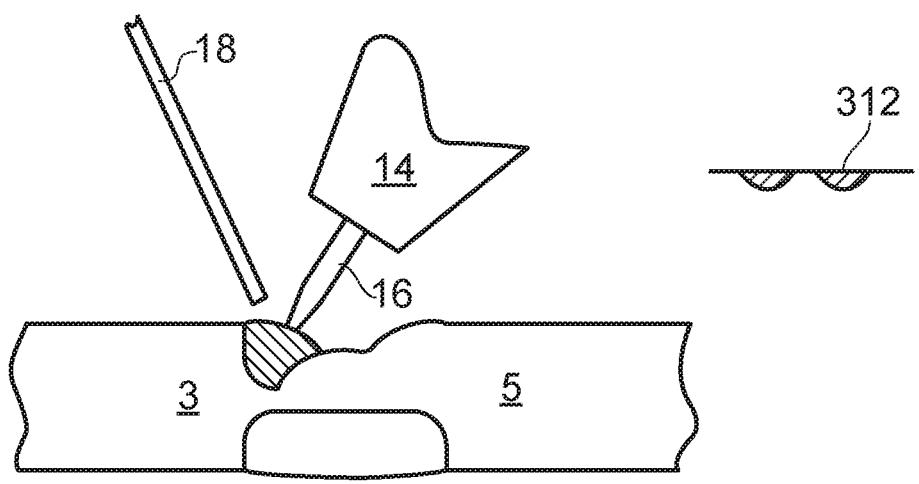
FIG. 8 is a cross-sectional view of a third welding stage of the method.
Figure 9:
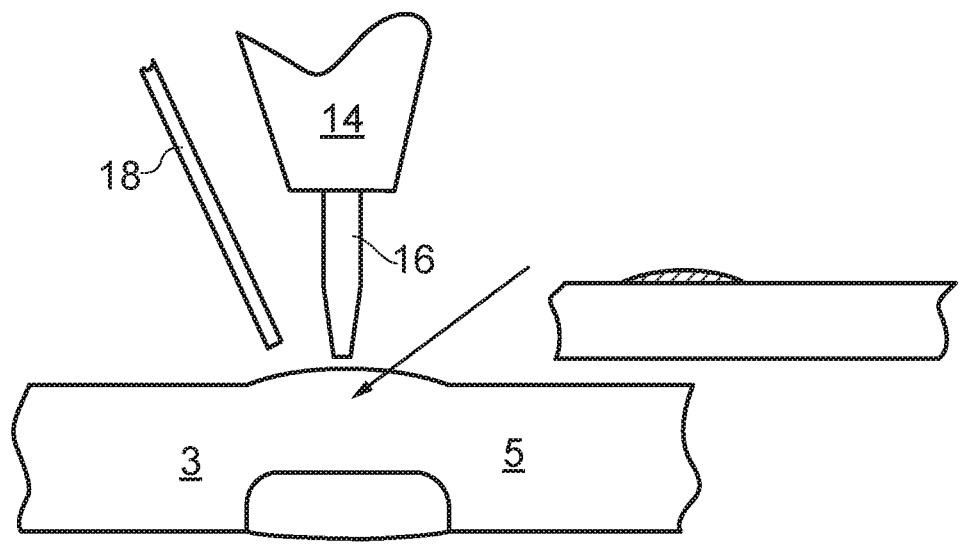
FIG. 9 is a cross-sectional view of a fourth welding stage of the method.
Figure 10:
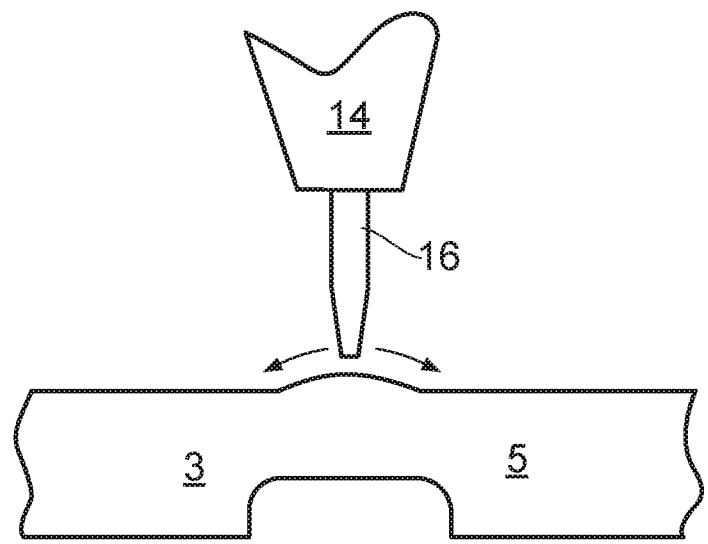
FIG. 10 is a cross-sectional view of a final cosmetic welding stage of the method.

The weld parameters for the third pass are again determined and, if necessary, refined at S10. The controller 6 then instructs the welding device 8 to perform the third weld pass at step S12. As shown in FIG. 8, in this instance, the third weld pass is located toward the stub-side of the U-shaped channel 10a.

The controller 6 again determines whether the number of passes completed m is less than the number of passes required n. In this example, the number of passes completed m (three) is less than the number of passes required n (four) and so the controller 6 again instructs the 3D scanner 4 to rescan the joint interface to determine the volume actually filled by the third weld pass and a remaining volume 312 to be filed (S14). The method then returns to step S10 to determine the weld parameters for the fourth weld pass.

The weld parameters for the fourth pass are again determined and, if necessary, refined at S10. The controller 6 then instructs the welding device 8 to perform the fourth weld pass at step S12. As shown in FIG. 8, in this instance, the fourth weld is located along the centre of the U-shaped channel 10a, where the outlet guide vane 5 abuts against the stub 3.

The controller 6 again determines whether the number of passes completed m is less than the number of passes required n. In this example, the number of passes completed m (four) is equal to the number of passes required n (four) and so the controller 6 determines that the welding process is complete. Indeed, as shown, following the fourth and final weld pass, the weld bead fills the U-shaped channel 10a entirely and sits just proud of the surface.

At step S18, a final cosmetic weld is completed to finalise the crown height and to reduce or remove any dressing required. As shown, with this cosmetic weld, the torch 14 is moved from side to side over the surface of the joint without the addition of any filler metal.

Although not shown in FIG. 4, the controller 6 may instruct the 3D scanner to rescan the joint interface after the required number of passes has been completed in order to confirm that the U-shaped channel 10a has been filled entirely. If this is not the case, then the method may return to S6.

Once the U-shaped channel 10a has been adequately filled, the process is repeated on the other side for the U-shaped channel 10b.

While the example presented above uses multiple passes to fill the volume, with certain geometries it may be possible to fill the volume using a single pass.

The algorithm used to determine the number of passes and the weld parameters may be a rule-based algorithm generated by expert operators. For example, in order to determine the number of passes, the algorithm may be restricted by a minimum overlap between passes to achieve proper fusion between passes. Alternatively, the algorithm may be a learning algorithm which forms artificial neural networks based on data generated from prior welding operations (for example, from trials based on representative test pieces). It will be appreciated that various techniques may be used to generate suitable algorithms for determining the desired weld parameters.

The welding apparatus and method of the invention allow for automated welding of the assembly. In this respect, "automated" does not require that there is no human involvement in the process, only that the involvement is reduced. In particular, it may be necessary for an operator to provide the controller 6 with certain information, such as the material of the assembly, the filler metal and shielding gas being used, etc. The apparatus and method do, however, remove operator input during the weld passes.

The invention is not limited to the embodiments described herein, and may be modified or adapted without departing from the scope of the present invention.

In particular, although the 3D scanner 4 has been described as being a non-contact scanner, it will be appreciated that contact-based scanners (using probes which physically touch the surface of the components) may also be used, where appropriate.

In particular, while a non-contact scanner will typically be quicker (particularly in this instance, as measurements can be made while the weld is still hot), contact-based scanners may be cheaper, smaller and more robust. Contact-based scanners may also be more appropriate for certain component geometries.

Further, although the invention has been described with reference to the joining of an outlet guide vane assembly, it will be appreciated that the invention may be applied to any suitable application. The invention may also be used in other welding processes, such as laser and electron beam welding.

It will be appreciated that certain steps of the method described previously may be omitted or reordered. In particular, the manner in which the method executes the welding process may be modified provided that the joint interface is scanned using the 3D scanner to determine a volume to be filled by the welding process, an algorithm is used to determine a specification for the welding process based on the volume to be filled, and the welding device is controlled so as to execute the specification by moving the welding device relative to the workpiece.

In any of the aspects or embodiments of the invention described above, the various features may be implemented in hardware, or as software modules running on one or more processors.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

The invention claimed is:

1. An automated welding apparatus comprising:
   a welding device configured to move relative to a workpiece in order to perform a welding process;
   a three-dimensional scanner configured to scan a joint interface of the workpiece and to determine a volume to be filled by the welding process; and
   a controller connected to the three-dimensional scanner and the welding device, the controller configured to determine a number of passes required to fill the volume, a position of each of the number of passes and an order of each of the number of passes based on the volume determined by the three-dimensional scanner, the controller being configured to control the welding device so as to execute each of the number of passes by moving the welding device relative to the workpiece, wherein
   the three-dimensional scanner is further configured to scan the joint interface of the workpiece after each of the number of passes to determine a remaining volume,
   the controller is further configured to determine weld parameters of the current number of passes based on the remaining volume, and
   after a completion of a final pass of the number of passes, the three-dimensional scanner is further configured to re-scan the joint interface of the workpiece, and in response to a determination that the weld is not complete, the controller and the three-dimensional scanner are configured to:
      determine a new number of passes required to fill a new volume, a position of each of the new number of passes and an order of each of the new number of passes based on the volume determined by the three-dimensional scanner, the controller being configured to control the welding device so as to execute each of the new number of passes by moving the welding device relative to the workpiece, scan the joint interface of the workpiece after each of the new number of passes to determine a remaining volume, and determine weld parameters of the current new number of passes based on the remaining volume.

2. The automated welding apparatus as claimed in claim 1, wherein the controller is configured to determine the position and order of the weld passes to optimise a defined characteristic including at least one of maximising speed, minimising filler metal, and achieving a prescribed quality level.

3. The automated welding apparatus as claimed in claim 1, wherein the controller is configured to adjust the welding process based on the remaining volume to be filled by the welding process.

4. The automated welding apparatus as claimed in claim 1, wherein the controller is configured to determine that the welding process is complete once the three-dimensional scanner determines that the volume has been fully filled.

5. The automated welding apparatus as claimed in claim 4, wherein the controller is configured to apply a cosmetic weld once the three-dimensional scanner determines that the volume has been fully filled.

6. The automated welding apparatus as claimed in claim 1, wherein the three-dimensional scanner is a non-contact scanner.

7. The automated welding apparatus as claimed in claim 1, wherein the welding device is an arc, laser or electron beam welding device.

8. A computer-implemented automated welding method comprising:

scanning a joint interface of a workpiece using a three-dimensional scanner;

determining a volume to be filled by a welding process;

determining a number of passes required to fill the volume, a position of each of the number of passes and an order of each of the number of passes for the welding process based on the volume to be filled; and controlling a welding device so as to execute each of the number of passes by moving the welding device relative to the workpiece;

scanning the joint interface of the workpiece after each of the number of passes to determine a remaining volume;

determining weld parameters of the current number of passes based on the remaining volume;

after a completion of a final pass of the number of passes, re-scanning the joint interface of the workpiece; and in response to a determination that the weld is not complete, determining a new number of passes required to fill a new volume, a position of each of the new number of passes and an order of each of the new number of passes based on the volume determined by the three-dimensional scanner, and controlling the welding device so as to execute each of the new number of passes by moving the welding device relative to the workpiece.

9. The computer-implemented automated welding method as claimed in claim 8, wherein the position and order of the weld passes is determined to optimize a defined characteristic including at least one of maximising speed, minimising filler metal, and achieving a prescribed quality level.

10. The computer-implemented automated welding method as claimed in claim 8, further comprising adjusting the welding process based on the remaining volume to be filled by the welding process.

11. The computer-implemented automated welding method as claimed in claim 8, further comprising determining that the welding process is complete when the volume has been fully filled.

12. The computer-implemented automated welding method as claimed in claim 11, further comprising applying a cosmetic weld once the volume has been fully filled.

13. The computer-implemented automated welding method as claimed in claim 8, wherein the three-dimensional scanner is a non-contact scanner.

14. The computer-implemented automated welding method as claimed in claim 8, wherein the welding device is an arc, laser or electron beam welding device.

* * * * *